June 5, 1956  D. S. LORD ET AL  2,748,486
COMPASS-SWINGING APPARATUS
Filed March 2, 1953  2 Sheets-Sheet 1

INVENTORS.
DWIGHT S. LORD
HAROLD A. MORRISON
BY
Reynolds, Beach & Christensen
ATTORNEYS June 5, 1956 D. S. LORD ET AL 2,748,486
COMPASS-SWINGING APPARATUS
Filed March 2, 1953 2 Sheets—Sheet 2

INVENTORS.
DWIGHT S. LORD
HAROLD A. MORRISON
BY
Reynolds, Beach & Christensen
ATTORNEYS

United States Patent Office 2,748,486
Patented June 5, 1956

2,748,486
COMPASS-SWINGING APPARATUS

Dwight S. Lord and Harold A. Morrison, Seattle, Wash., assignors to Boeing Airplane Company, Seattle, Wash., a corporation of Delaware Application March 2, 1953, Serial No. 339,519

3 Claims. (Cl. 33—46)

Compass-swinging as heretofore practiced with aircraft has consisted of orienting the aircraft very precisely with relation to a compass rose laid out on the ground, by shifting the aircraft bodily until it is aligned with an element of the compass rose at a known heading, and then comparing the reading of the compass within the aircraft with the known and precisely aligned heading indicated by the compass rose. Obviously the airplane had to be precisely correctly oriented, to do which it had to be shifted repeatedly by minute distances and through very small angles, and, moreover, this process had to be repeated on a number of different headings, in order to test the compass in the aircraft at different headings, for it might depart from accuracy at one heading and show no error at another heading. It is obvious that the process is a tedious and therefore an expensive one, and that it is subject to error in accordance with the degree of care with which it is performed, and in accordance with the physical limitations of sighting or aligning bars and the like, used in carrying out the process.

Such a procedure is physically out of the question for large heavy airplanes, such, for example, as bombers or large heavy transports or cargo planes. They can not be thus accurately and minutely shifted and oriented. It is the primary object of the present invention to provide an instrument whereby, with no necessity of any precise location or orientation of the aircraft, the correct heading of such large aircraft (and smaller ones as well) can be ascertained with a high degree of accuracy, and thus can be compared with the actual heading upon the installed compass.

It is moreover an object of this invention to provide an instrument for use in compass-swinging that is so simple in operation that the matter will not be postponed, and can be accomplished at as frequent intervals as may seem desirable, and in a relatively short time and at small cost.

Moreover, it is an object to provide an instrument which, though it attaches to the aircraft, can be readily dismounted when not in use and accurately and easily mounted when it is to be used, and is small, simple and light, and which requires no other instrument except a common surveyor's transit.

With such objects in mind, and others as will appear hereinafter, the invention comprises the novel instrument as shown in the accompanying drawings, and as will be more fully hereinafter disclosed and claimed.

Figure 1:
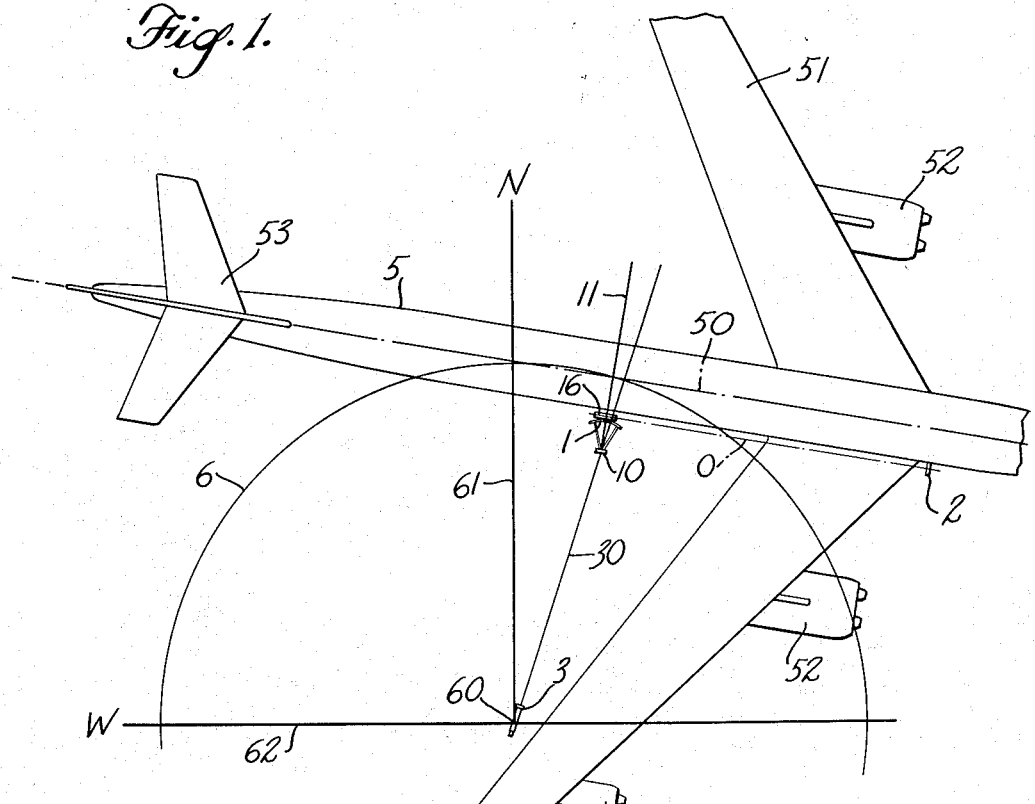
Figure 1 is a top plan view of an airplane positioned with relation to a compass rose during the operation of verifying a bearing of the airplane's compass.

The aircraft illustrated in Figure 1 is intended to represent a large multi-jet airplane, the compass whereof it is desired to verify. Its fuselage 5, its wings 51, its engine pods 52, and its tail surfaces 53 are illustrated. It is a land plane, and so would be mounted for taxiing upon wheels which do not appear, for the reason that Figure 1 is a top plan view. Its longitudinal center line is indicated at 50.

Such an aircraft would be towed to a position adjacent the periphery, indicated at 6, of a compass rose laid out upon the ground. The north line 61 and a west line 62 of the rose are illustrated, radiating from its center 60. In towing the aircraft to position, no pains are taken to locate it at any particular point or heading relative to the compass rose, nor to its circumference 6. Obviously it would be difficult to orient it precisely in any event, because of the size of the aircraft and the manner in which it must be towed into position, but it is not necessary to do so according to the present method. The aircraft is simply towed to a position where its longitudinal center line 50 is more or less tangent to the circumference 6 of the compass rose, and yet this longitudinal center line may intersect the circumference 6 chordally. Actually, a compass rose is not essential, and all that is actually needed is a line accurately denoting a known compass heading, as North. Nothing more is essential, and even that may be improvised or laid out for the occasion, if done accurately.

It will be necessary that the aircraft which is to have its compass tested according to the present method be provided with at least one, and preferably two, prepared mounts in its skin, for the reception and mounting of the necessary instruments. It is possible that a single mount will suffice, but preferably there are two such mounts, and both are illustrated in the drawings. These two mounts are quite precisely located relative to one another and to the center line 50, as will appear shortly.

Figure 4:
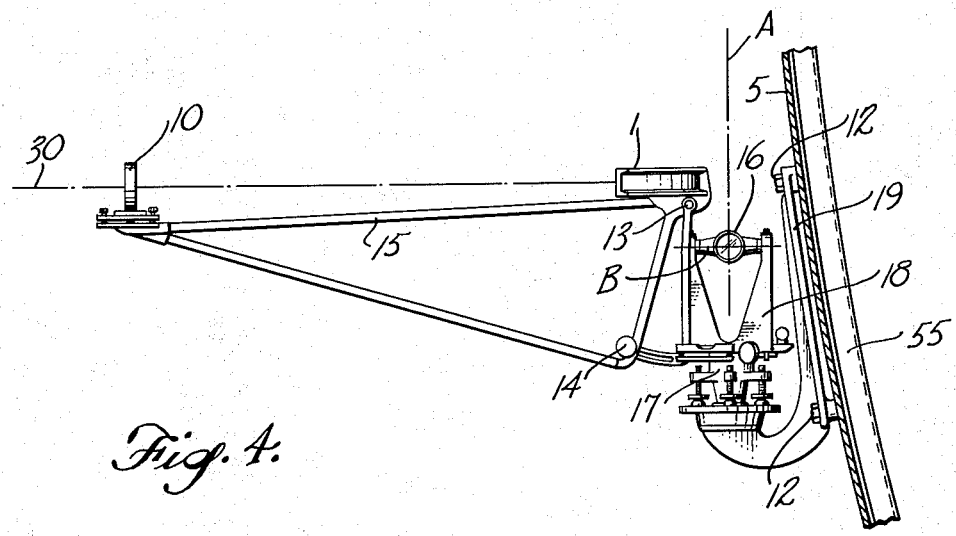
Figure 4 is a side elevational view, of the principal instrument employed in the method, and itself constituting part of this invention.

At one such mount, indicated at 55 (Figure 4), is removably secured the mounting bracket 19 of the primary instrument, as by the mounting screws 12 or any other suitable means. That instrument consists in essence of a generally horizontal sector scale 1 which when mounted is concaved outwardly or away from the side of the fuselage 5, and a cross-hair 10, located generally uprightly, at the center or axis of the sector scale 1. However, in order to permit convenient employment and adjustment for precise orientation of the sector scale and its cross-hair, several other instrumentalities are needed, and are constructed as a part of this instrument.

Upon the mounting bracket 19 is supported a secondary mount 18 for rotation about an upright axis A close to which the zero point of sector scale 1 is located. This secondary mount 18 can be leveled and adjusted for rotation about the axis A by suitable mechanism illustrated at 17, which may be of the type commonly used in transits. A telescope 16 is mounted on the secondary mount 18. This telescope is directed generally longitudinally of the aircraft when the parts are mounted as described, and its optical axis is indicated at O. It may tilt in a vertical plane upon the secondary mount 18, the tilting axis being indicated at B. The purpose of this will shortly appear.

The sector scale 1 and its cross-hair 10 might be fixedly secured to the secondary mount 18, but preferably, for a purpose which will appear shortly, it is pivotally mounted at 13 to swing about an axis generally parallel to the optical axis O, and passing close to the sector scale zero. The arm 15 whereon the cross-hair and scale are supported can be adjusted up and down about the pivotal mounting at 13, and held in any adjusted position desired by the mechanism indicated at 14.

By rotation about the axis A the line 11, which is a radius from the cross-hair 10 as a center through the scale zero, is adjusted to a position precisely perpendicular to the longitudinal center line 50 of the aircraft. It would be possible so to locate it without any adjustment by proper design of the instrument and by preparation of the mount 55, but since such conditions, though initially correct, may change, it is preferred that the perpendicularity of the line 11 be verified and achieved each time the compass is swung, by the employment of the telescope 16, and by the construction of the instrument as just described. Accordingly, a target 2, which in effect is a cross-hair, is mounted on the fuselage 5 at a point distant from the mount 55 for the sector scale, its similarly prepared mount being spaced from the longitudinal center line 50 by such distance, with respect to the spacing of the mount 55 from the center line 50, that when the telescope 16 is directed on the target 2 and brought to bear thereon by suitable rotative adjustment about the axis A, it can be correctly assumed that the line 11 is exactly perpendicular to the longitudinal center line 50. The sector scale and the target 2 are sufficiently distantly spaced to assure this result. Since the aircraft need not be leveled, and the ground may be slightly inclined or rough, the tilting of the telescope about the axis B will serve to permit it to bear on the target 2 whether the latter may be slightly above or slightly below the initial line of sight O through the telescope.

During the time the sector scale 1 is being mounted and properly oriented, or before or after, a transit 3 is being set up at the center 60 of the compass rose and is oriented with respect to one or more of the radial lines of known bearing 61, 62, etc. One such line is chosen as zero azimuth, and we can assume that it is the line 61 which is chosen as the corrected zero azimuth. The transit is swung through an angle of departure from this zero azimuth, which angle we can designate as $\alpha$, until it is brought to bear on the cross-hair 10. This line of sight is indicated at 30, and will at this cross-hair, in most instances, intersect the perpendicular line 11 at some angle, and that angle can be read on the scale 1 through the transit. Of course it may be necessary to elevate or lower the cross-hair 10 to bring the line of sight 30 in line with the cross-hair 10 and the scale 1. It is for such purposes that the adjustment at 14 is provided. The angle read on the scale 1 from the transit 3, which may be positive or negative with relation to the scale zero, located intermediate the scale's ends, may be taken as the angle $\beta$ which is the angle of departure of the line of sight 30 from scale zero.

Figure 2:
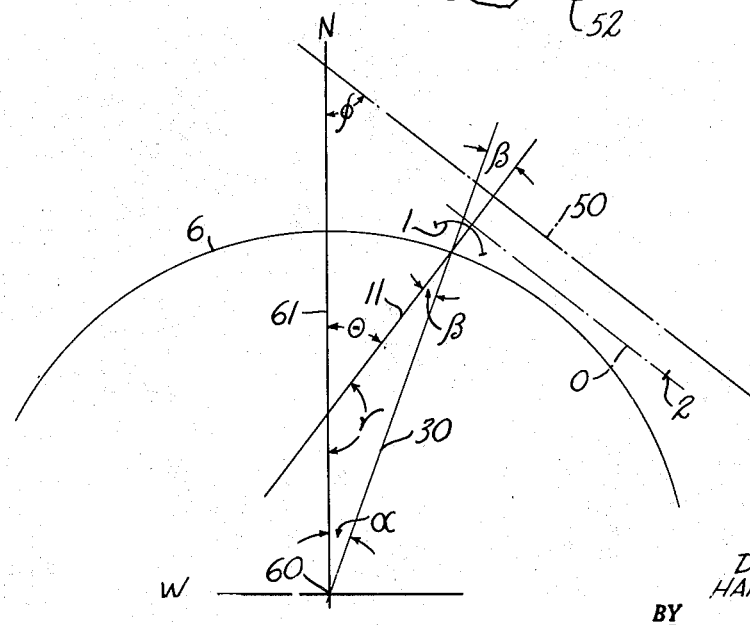
Figure 2 is a geometrical diagram similar to Figure 1 clarifying the geometrical principles involved.
Figure 3:
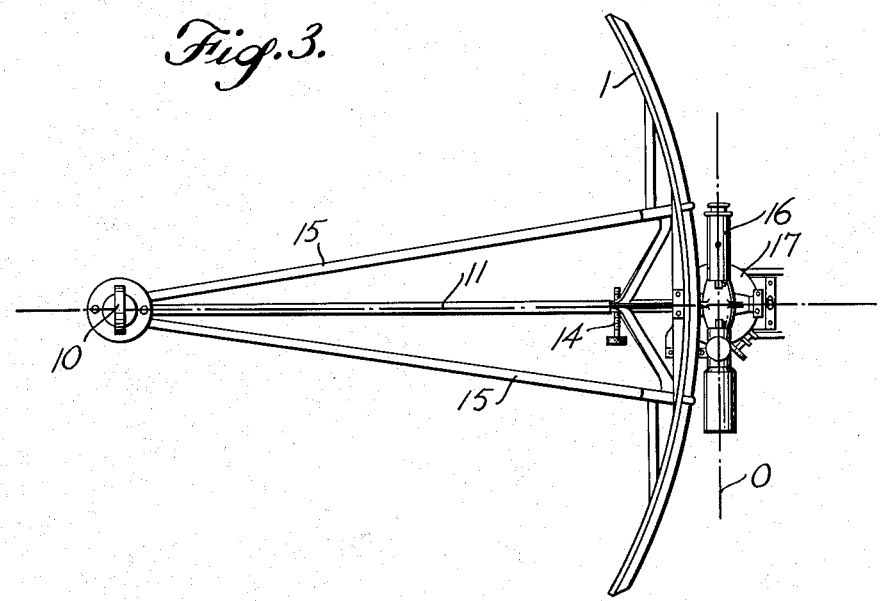
Figure 3 is a plan view.

Now by reference to Figure 2 (wherein the angles differ somewhat from those in Figure 1) it will be seen that it becomes possible to construct a triangle, two angles of which, $\alpha$ and $\beta$, are known, from which we can determine the third angle $\gamma$. Then by constructing a right triangle on the lines 11, 50 and 61, we can ascertain the angle supplemental to $\gamma$, and thereby by simple solution of the right triangle can determine precisely the angle $\phi$ which gives the angular heading of the center line 50 of the aircraft. Care must be taken, of course, to correct for the heading of the aircraft, that is to say, whether its nose is at the right as illustrated, or at the left, and the relationship of the line 61 to magnetic north if it does not point north, but by simple geometrical calculations of angles from the two angles $\alpha$ and $\beta$ so easily determined thus, corrected by addition or subtraction to compensate for any deviation of the zero azimuth from magnetic north, it is possible to ascertain the precise heading of the aircraft for comparison with the compass mounted within the aircraft.

To take a specific situation by way of example, we may assume that the angle $\beta$ read on the sector scale 1 is 17° 45′, and that the angle $\alpha$, calculated from the line 61, reads 20° 25′ on the transit's scale. The angle $\phi$ is the unknown angle of bearing from azimuth zero line 61. The angle $\phi$ is one of the acute angles of a right triangle defined by the lines 61, 50, 11, therefore if we can determine the other acute angle $\theta$ of that right triangle, we can ascertain the angle $\phi$. The angle $\theta$ is the angle complemental to the angle $\gamma$ of the triangle 61, of which the two angles $\alpha$ and $\beta$ are known, hence $$\gamma = 180° - (\alpha + \beta)$$
$$\theta = 180° - \gamma$$

or more simply $$\theta = \alpha + \beta$$

from which it is determined that $$\phi = 90° - \theta, \text{ or } \phi = 90° - (\alpha + \beta)$$

Substituting the known values of $\alpha$ and $\beta$, $$\phi = 90° - (20° 25′ + 17° 45′) = 51° 50′$$

But the aircraft is heading somewhat south of east, hence 90° must be added, to arrive at the correct magnetic heading, 141° 50′.

It has been stated that no compass rose as such is needed, and that a single line such as 61 of known bearing is all that is required. In the latter case any point on such a line may be assumed as the center 60, and the aircraft may be as distant therefrom, and oriented with respect thereto in whatever manner, as is physically practicable. If the angle $\alpha$ becomes small, or large, by removal or approach of the selected point 60 along line 61, respectively, then the angle $\beta$ also becomes small or large, correspondingly, but always the angle $\gamma$ and the angle complemental thereto can be ascertained by simple geometry, and the ultimate angle $\phi$ is always the same for any given heading.

We claim as our invention:

1. In combination with an airplane formed with an exterior side mount oriented in known relation to the airplane's longitudinal center line, a mounting bracket formed to mate with said mount and means to secure the same upon said mount, to orient said mounting bracket in turn in known relation to such center line, a sector scale supported on said mounting bracket and oriented, by the latter's securement on the mount, in fixed relation to the airplane's longitudinal center line, said sector scale being thereby disposed in a generally horizontal plane, projecting from the airplane, and concave away from the same, with its zero substantially at its midpoint, nearest the mounting bracket, an arm supported from and projecting outwardly from said mounting bracket, and a cross-hair carried on said arm to lie in the axis of the sector scale, and positioned by its support upon said arm, and the latter upon the mounting bracket, in a line through the scale's zero point which is perpendicular to the airplane's longitudinal center line.

2. The combination set forth in claim 1, including a second exterior side mount on the airplane, spaced longitudinally distantly from the first, and likewise oriented in known relation to the airplane's longitudinal center line, a second mounting bracket carrying a target and formed to mate with the second side mount, and means to secure the same upon said latter mount, to orient said second side mount and its target in known relation to such center line, an upright pivotal mount interposed between the first side mount and the sector scale and cross-hair carrying arm, whereby the scale and arm may be swung angularly and conjointly in the plane of the sector scale, relative to the first mount, and a telescope mounted on and swingable with said sector scale, and positioned with its optical axis at a known angle to the line through the cross-hair and the scale zero, whereby the telescope may be directed on the target, to orient that line perpendicular to the airplane's longitudinal center line.

3. The combination set forth in claim 1, including a pivotal mount interposed between the sector scale, arm and cross-hair, and the mounting bracket, and directed parallel to the airplane's longitudinal center line, to elevate or lower the line through the cross-hair to the scale zero to a given height above ground level at a given distance laterally from the airplane.

References Cited in the file of this patent

UNITED STATES PATENTS

| | | |
|---|---|---|
| 1,629,238 | Terraz | May 17, 1927 |
| 2,386,420 | Bailey et al. | Oct. 9, 1945 |
| 2,395,528 | Andersen | Feb. 26, 1946 |
| 2,509,116 | Wakefield | May 23, 1950 |

FOREIGN PATENTS

| | | |
|---|---|---|
| 934,900 | France | Jan. 19, 1948 |
| 980,242 | France | Dec. 27, 1950 |